United States Patent [19]
Hickman

[11] Patent Number: 5,361,564
[45] Date of Patent: Nov. 8, 1994

[54] HORSE LEG NET

[76] Inventor: John Hickman, 1598 Lawhorn Rd., Cassatt, S.C. 29032

[21] Appl. No.: 75,390

[22] Filed: Jun. 14, 1993

[51] Int. Cl.$^5$ .............................................. B68C 5/00
[52] U.S. Cl. ........................................ 54/80.4; 54/82
[58] Field of Search ...................... 54/79.2, 79.4, 80.1, 54/80.4, 82

[56] References Cited

U.S. PATENT DOCUMENTS

| 1,218,829 | 3/1917 | Bean | 54/80.4 |
| 3,747,565 | 7/1973 | Kellam | 54/82 |
| 3,851,447 | 12/1974 | Pontarella | 54/80.1 |
| 4,791,777 | 12/1988 | Sacane | 54/80.4 |
| 4,911,150 | 3/1990 | Farley | 54/82 X |

FOREIGN PATENT DOCUMENTS

| 2404428 | 6/1979 | France | 54/82 |
| 2077565 | 12/1981 | United Kingdom | 54/80.1 |

Primary Examiner—Robert P. Swiatek

[57] ABSTRACT

A net is adapted to wrap around the front legs of a horse to prevent flies and other insects from alighting thereon. The net can be an elongated rectangular panel of fiberglass netting attachable to the horse's legs by means of one or more strips of hook and loop material, such as VELCRO. The net can be secured just above the horse's knee joint and the remainder can hang down to a point just above the hoof. The net can be applied or removed easily and quickly, and once in position, the net should not inhibit the movement of the horse in any way.

3 Claims, 4 Drawing Sheets

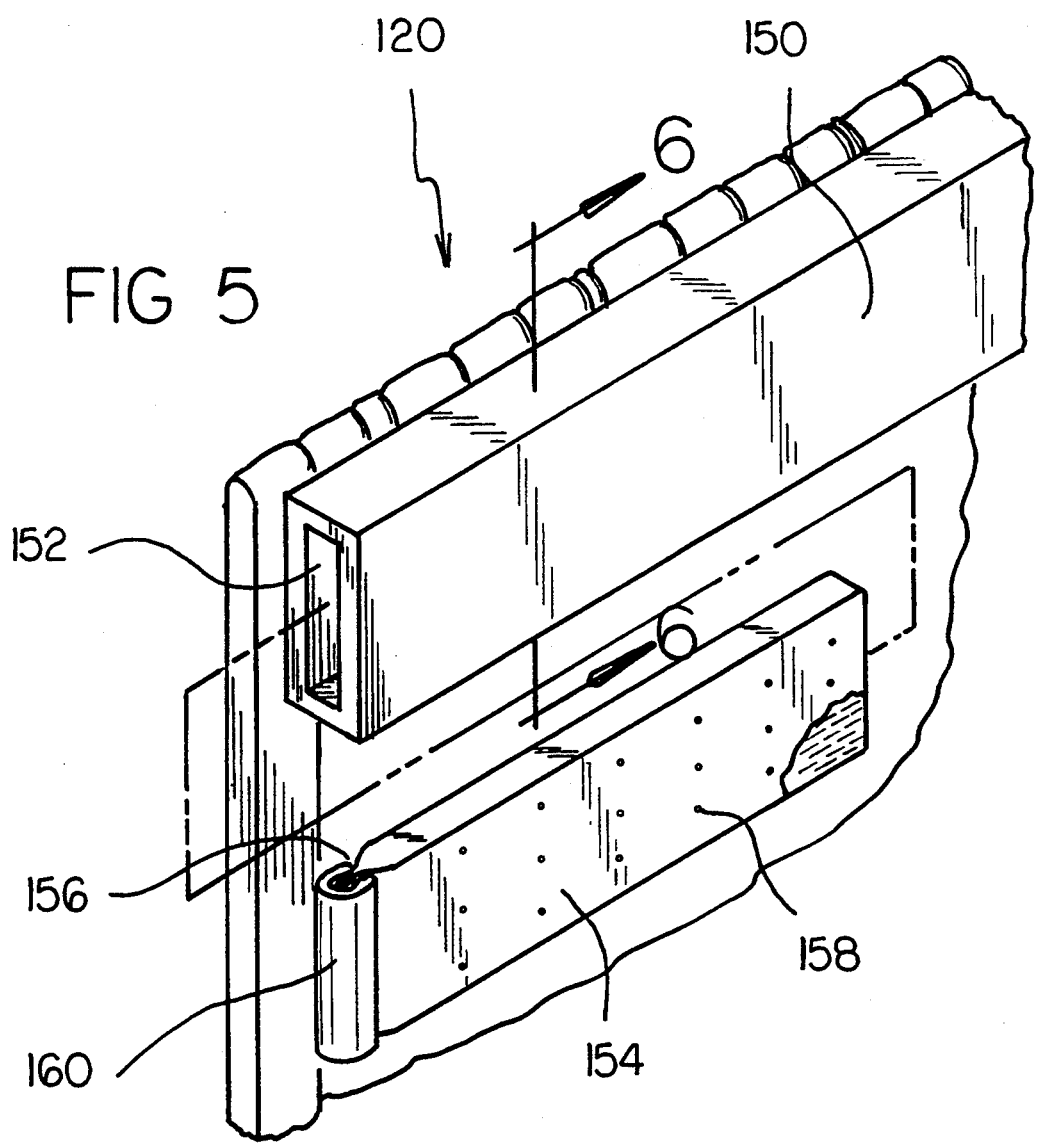
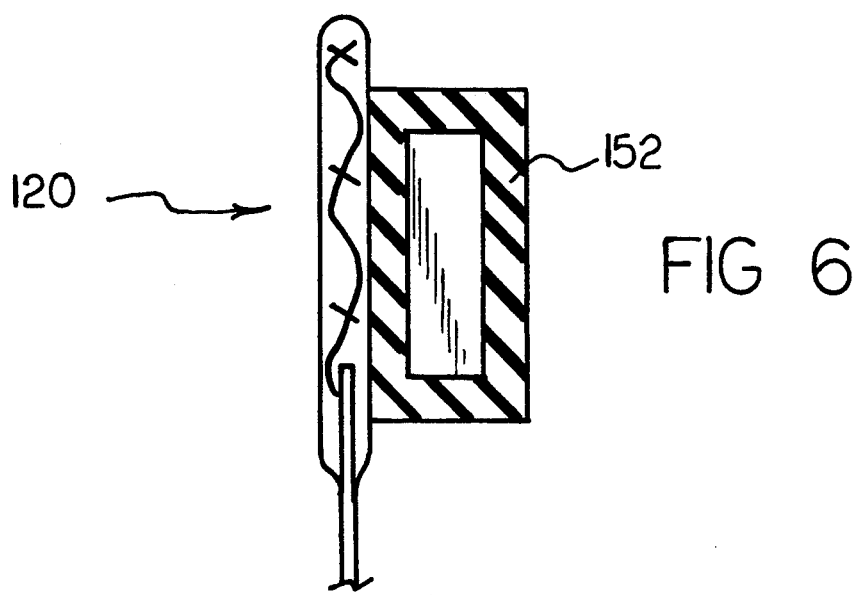

HORSE LEG NET

BACKGROUND OF THE INVENTION

1. Field of the Invention

The present invention relates generally to devices for horses and other animals, and more particularly, to a device for keeping flies and insects off of the legs of horses and similar animals.

2. Description of the Prior Art

Leg guards for horses in the form of supports and braces for preventing leg injuries are well known in the art of devices for animals (see for examples, U.S. Pat. Nos. 4,685,278; 4,911,156; and 4,470,411).

Also known is a complex anti-insect net device for protecting an animal against flies, insects and the like which covers most of the body of an animal (see U.S. Pat. No. 4,305,243).

Thus, while the foregoing body of prior art indicates it to be known to use a complex anti-insect net to protect an animal from flies and insects and the like, the provision of a more simple and cost effective device is not contemplated. Nor does the prior art described above teach or suggest a horse leg netting device which may be used by individuals on the front legs of horses or similar animals to prevent flies, other insects and the like frown alighting thereon. The foregoing disadvantages are overcome by the unique horse leg net of the present invention as will be made apparent from the following description thereof. Other advantages of the present invention over the prior art also will be rendered evident.

SUMMARY OF THE INVENTION

To achieve the foregoing and other advantages, the present invention, briefly described, provides a net adapted to wrap around the front legs of a horse to prevent flies and other insects from alighting thereon. The net can be an elongated rectangular panel of fiberglass netting attachable to the horse's legs by means of one or more strips of hook and loop material, such as VELCRO. The net can be secured just above the horse's knee joint and the remainder can hang down to a point just above the hoof. The net can be applied or removed easily and quickly, and once in position, the net should not inhibit the movement of the horse in any way.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new horse leg net which has all of the advantages of the prior art and none of the disadvantages.

It is another object of the present invention to provide a new horse leg net which may be easily and efficiently manufactured and marketed.

It is a further objective of the present invention to provide a new horse leg net which is of durable and reliable construction.

An even further object of the present invention is to provide a new horse leg net which is susceptible of a low cost of manufacture with regard to both materials and labor, and which accordingly is then susceptible of low prices of sale to the consuming public, thereby making such horse leg net available to the buying public.

Still yet a further object of the present invention is to provide a new horse leg net which can be wrapped around the two front legs of a horse to prevent flies, insects and the like from alighting thereon.

It is still a further object of the present invention to provide a new horse leg net which attaches above the horse's knee joint and hangs down to a point just above the horse's hoof.

Still a further object of the present invention is to provide a new horse leg net including means for attaching the leg net to the horse's legs, the attaching means preferably being made of a hook and loop material (such as VELCRO).

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 5 is a perspective view in elevation of a second preferred embodiment of the present invention.

FIG. 6 is a cross-sectional side view of the second embodiment horse leg net of FIG. 5 taken along line 6—6 thereof all in accordance with the present invention.

DESCRIPTION OF THE PREFERRED EMBODIMENT

Figure 1:
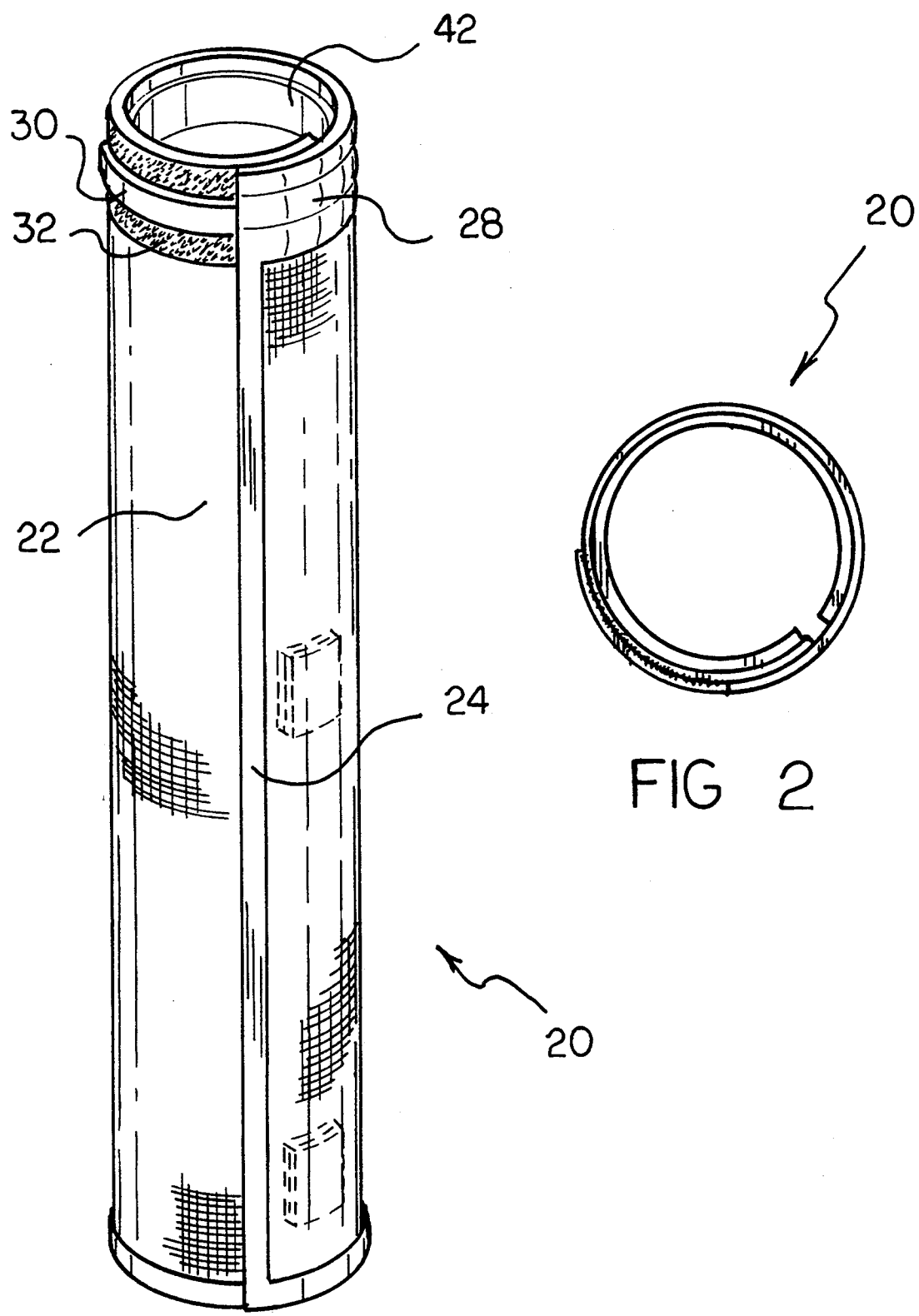
FIG. 1 is a perspective view showing the first preferred embodiment of the horse leg net (shown in a rolled up position) in accordance with the present invention.
Figure 2:
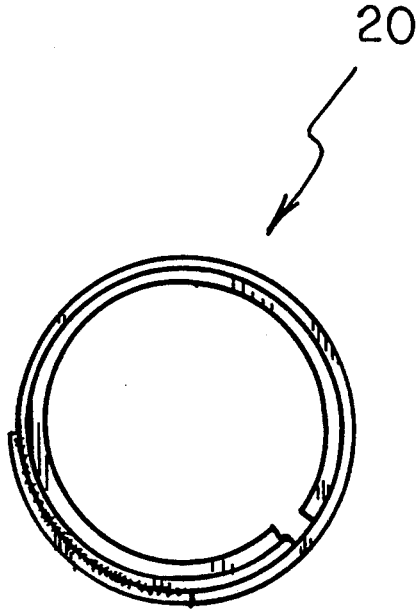
FIG. 2 is a top view of the horse leg net (again shown rolled up) of FIG. 1 in accordance with the present invention.
Figure 3:
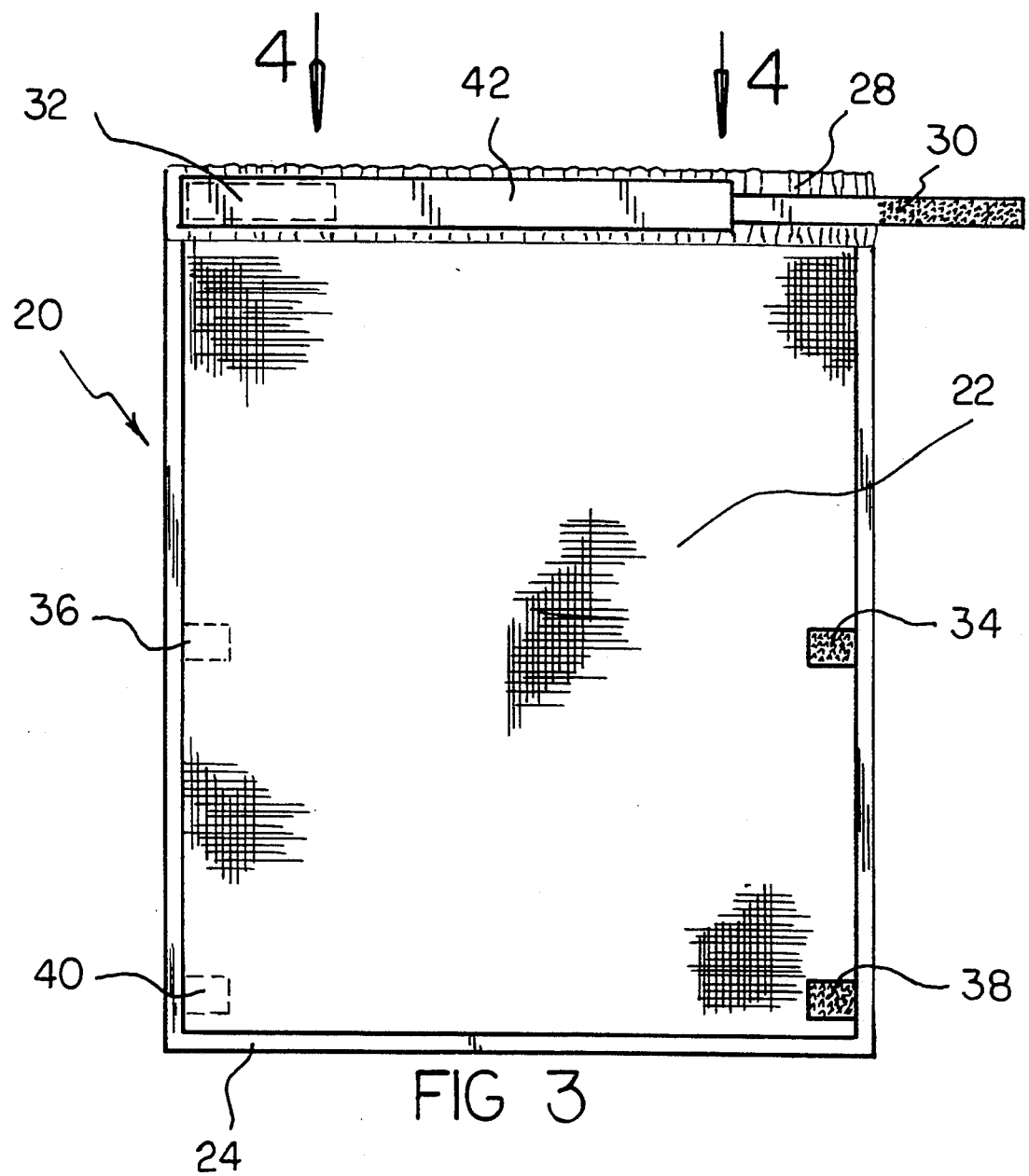
FIG. 3 is a perspective side view of the horse leg net of FIGS. 1 and 2, shown in an unrolled position, in accordance with the present invention.
Figure 4:
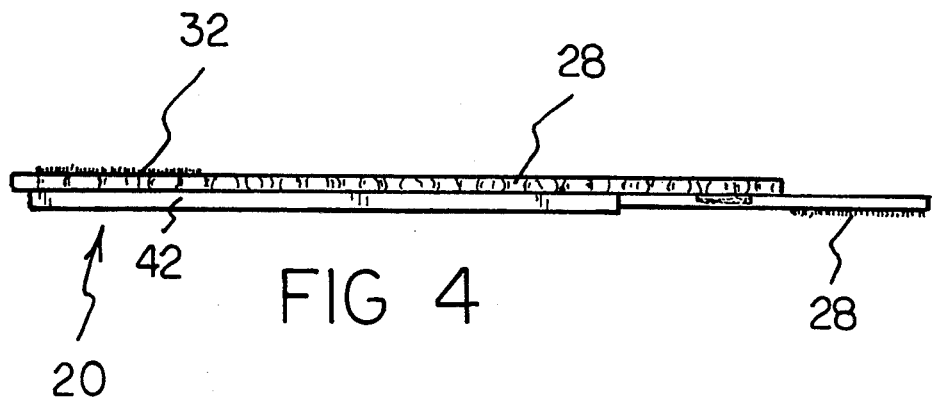
FIG. 4 is a top view along line 4—4 in FIG. 3 of the unrolled horse leg net in accordance with the present invention.

With reference now to the drawings, a new horse leg net embodying the principles and concepts of the present invention will be described.

Turning initially to FIGS. 1-4 (particularly FIG. 3), there is shown a first exemplary embodiment of the horse leg net of the invention generally designated by reference numeral 20. In its preferred form, horse leg net 20 comprises generally an elongated preferably rectangular, preferably fiberglass mesh netting 22.

The perimeter of the netting 22 is surrounded on its sides and at its bottom by a suitable perimeter material 24 to keep the fiberglass mesh from becoming ripped or frayed.

A strip or band 28 is fixed to the netting 22 adjacent the top perimeter of the netting 22. The band 28 is preferably made of a tough material such as denim.

A long top hook and loop material (for example VELCRO) strip 30, located on the inside of leg net 20, is fixed to and sticks out away from the band 28. A mating hook and loop strip 32 (for mating with strip 30) is located on the outside of leg net 20.

A middle small hook and loop piece 34 is located on the inside of the net 20 (near the net's middle) and a mating middle small hook and loop piece 36 is oppositely located on the outside of the net 20.

Similarly, a bottom small hook and loop piece 38 is located on the inside of the net 20 (near the net's bottom) and a bottom small hook and loop piece 40 is oppositely located on the outside of the net 20.

A soft liner 42 preferably made of foam rubber is fixed to the inside of the band 28.

The horse leg net 20 of the present invention is very easy to use and very quick to install onto and remove from a horse or other similar animal. One net 20 is simply wrapped around each of the horse's front legs and the top hook and loop strips 30 and 32 are mated to each other at a point above the horse's knee joint. Next, the middle and then the lower hook and loop pieces are mated and the net 20 is allowed to hang down to a point preferably just above the horse's hoof. Flies and other insects will not be able to alight on the horses front legs.

A second embodiment horse leg net 120 is shown in FIGS. 5 and 6. The second embodiment leg net 120 further comprises an open cell foam rubber shell 150 having a hollow center with hollow center opening 152.

A soft flexible container pouch 154 is adapted to fit within the shell 150. The pouch can be filled with liquid through an opening at one end 156 (which is shown squeezed closed in the Figure). The liquid can flow out of weep holes 158 in the pouch. A scaling clasp 160 can be used to squeeze the open end of the pouch shut as is shown in the Figure.

Use of the second embodiment horse leg net is the same as the first embodiment with the addition that the pouch can be filled with a liquid such as a bug repellant, and the bug repellent will seep out of the weep holes 158 and then slowly filter through the open pores of the shell 150. Any flies or other insects will then be repelled by the bug repelling liquid.

Figure 7:
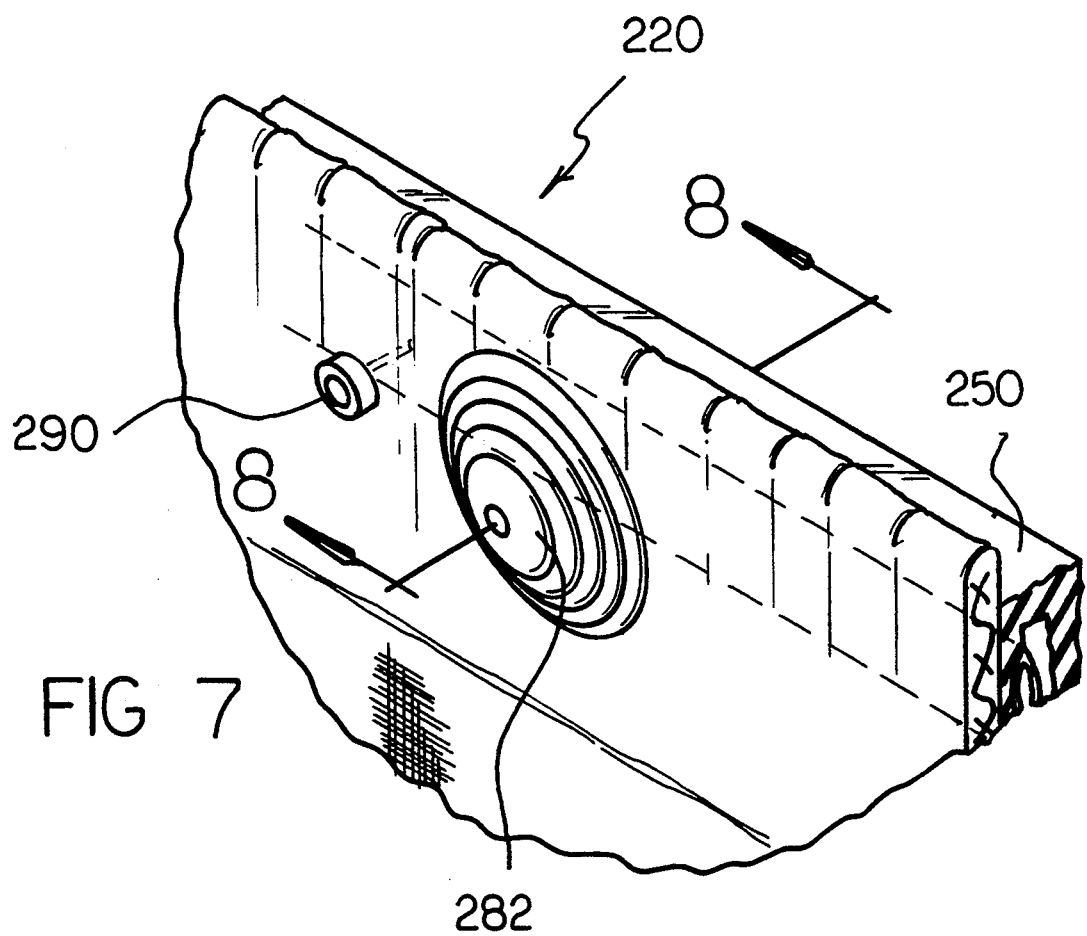
FIG. 7 is a partial perspective view in elevation of a third preferred embodiment of the present invention.
Figure 8:
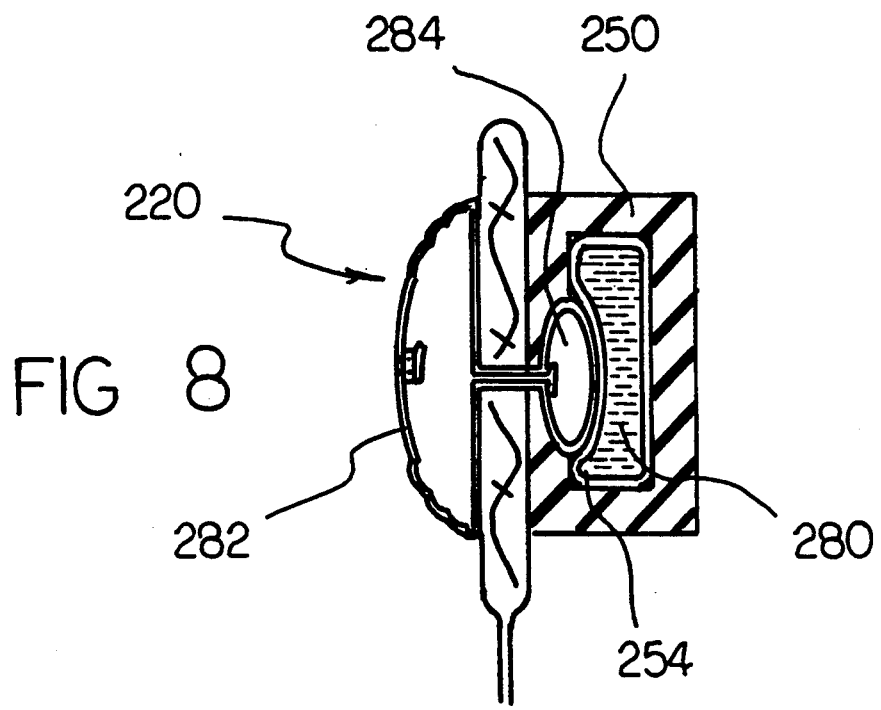
FIG. 8 is a cross-sectional side view of the third preferred embodiment of the present invention taken along 8—8 of FIG. 7.

A third embodiment horse leg net 220 is shown in FIGS. 7 and 8. The third embodiment leg net further comprises an open cell foam rubber shell 250 and a liquid containing pouch 254 (shown containing liquid 280 in the Figure). The leg net 220 also has an inflator 282 which can be push inflated to push a pusher 284 against the back wall of the shell 250 which in turn provides a compression force against the pouch 254, forcing the liquid 280 to seep out faster. A deflator 290 can be used to deflate the inflator, thus removing the added force against the pouch 254 and slowing down the rate of the liquid flow.

The leg net of the present invention is intended primarily for use on the front legs of horses since horses can not reach their front legs with their tails to swat flies and the like away. However, the leg net could also be used for the back legs of horses as well as for other animals such as mules, donkeys, cattle and the like, and these uses should be considered within the scope of the invention.

It is apparent from the above that the present invention accomplishes all of the objectives set forth by providing a new device for preventing flies and the like from alighting on a leg of a horse or other similar animal comprising: an elongated section of netting which can be wrapped around the leg of the animal and an attaching means which can temporarily attach the elongated netting to the leg of the animal. The attaching means can be at least one, and preferably a plurality of, hook and loop mating attaching means. The elongated section of netting can be comprised of a fiberglass netting material. The invention can further comprise at least one durable material around the perimeter of the elongated section of fiberglass netting. The durable material can be a denim material. The invention can further comprise a layer of cushioning material underneath the denim material.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A horse leg net comprising:
   a substantially rectangular-shaped section of fiberglass mesh netting, said netting having opposed first and second sides, a perimeter, top and bottom edges, and interior and exterior surfaces;
   a length of perimeter material secured to and extending about said netting on said sides and said bottom edge thereof;
   a band fixed to said top edge of said netting;
   a first top hook and loop material secured to said interior surface of said netting along said top edge thereof;
   a second top hook and loop material secured to said exterior surface of said netting along said top edge thereof;
   a first middle hook and loop material secured to said interior surface of said netting along said first side thereof and positioned medially between said top and bottom edges;
   a second middle hook and loop material secured to said interior surface of said netting along said second side thereof and positioned medially between said top and bottom edges;
   a first bottom hook and loop material secured to said interior surface of said netting along said first side thereof and positioned proximal to said bottom edge;
   a second bottom hook and loop material secured to said interior surface of said netting along said second side thereof and positioned proximal to said bottom edge, said first hook and loop material being selectively engagable to said second hook and loop material to secure said horse leg net about a leg of a horse; and,
   a foam rubber liner secured to said band along said top edge of said netting, said foam rubber liner having a transverse width substantially less than a transverse width of said band, with said liner being transversely centered between a topmost edge of said band and a lowermost edge of said band.

2. The horse leg net as recited in claim 1, wherein said foam rubber liner comprises an open-cell foam rubber shell having a hollow center interior, and further comprising a container pouch positioned within said hollow center interior of said shell, said pouch having a plurality of weep holes extending therethrough which permit a dispensing of a liquid from within said pouch through said weep holes, wherein said liquid will filter through open cells of said shell and onto said leg of said horse.

3. The horse leg net as recited in claim 2, and further comprising a pusher mounted within said hollow center interior of said shell adjacent to said pouch, and an inflater in fluid communication with said pusher to effect inflation of said pusher, thereby causing said pusher to exert pressure against said pouch to effect increased dispensing of said liquid through said weep holes.

* * * * *